No. 799,183. PATENTED SEPT. 12, 1905.
L. H. NIELSEN.
JUNCTION BOX.
APPLICATION FILED JAN. 16, 1903.

WITNESSES:
Robert Head
C. R. Ferguson

INVENTOR
Ludvig H. Nielsen
BY
ATTORNEYS

UNITED STATES PATENT OFFICE.

LUDVIG H. NIELSEN, OF NEW YORK, N. Y., ASSIGNOR TO MARK SIMONTON, OF COLUMBUS, OHIO.

JUNCTION-BOX.

No. 799,183.  Specification of Letters Patent.  Patented Sept. 12, 1905.

Application filed January 16, 1903. Serial No. 139,300.

*To all whom it may concern:*

Be it known that I, LUDVIG H. NIELSEN, a citizen of the United States, and a resident of the city of New York, borough of Brooklyn, in the county of Kings and State of New York, have invented a new and Improved Junction-Box, of which the following is a full, clear, and exact description.

This invention relates to improvements in junction or outlet boxes for electric wiring, an object being to provide a junction-box that may be readily adapted to walls, partitions, ceilings, or floors of different thicknesses, and also to provide a simple means whereby the box may be leveled or straightened in walls, partitions, ceilings, or floors having irregular surfaces, and still further to provide a means for attaching a fixture that will not only reduce the cost of production, but will facilitate the manipulation of wiring, and consequently reduce the amount of labor for installing the devices.

I will describe a junction-box embodying my invention and then point out the novel features in the appended claims.

Reference is to be had to the accompanying drawings, forming a part of this specification, in which similar characters of reference indicate corresponding parts in all the figures.

Figure 1:
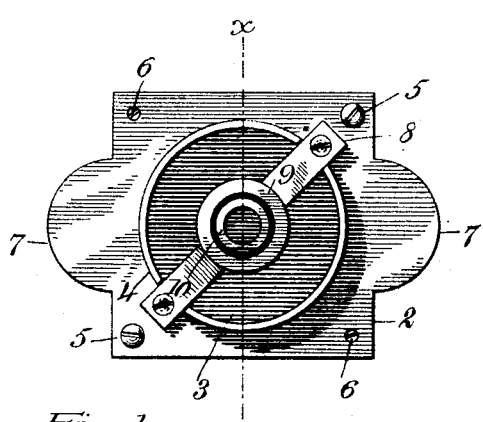
Figure 2:
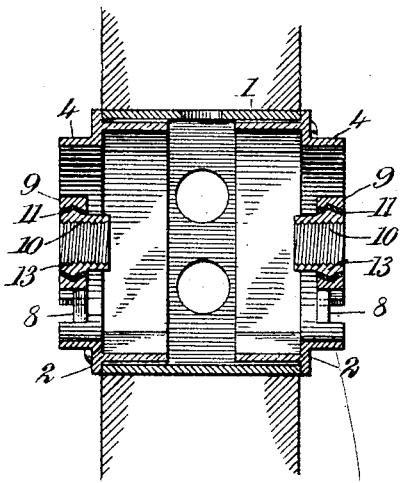
Figures 3, 4, 5, 6, 7:
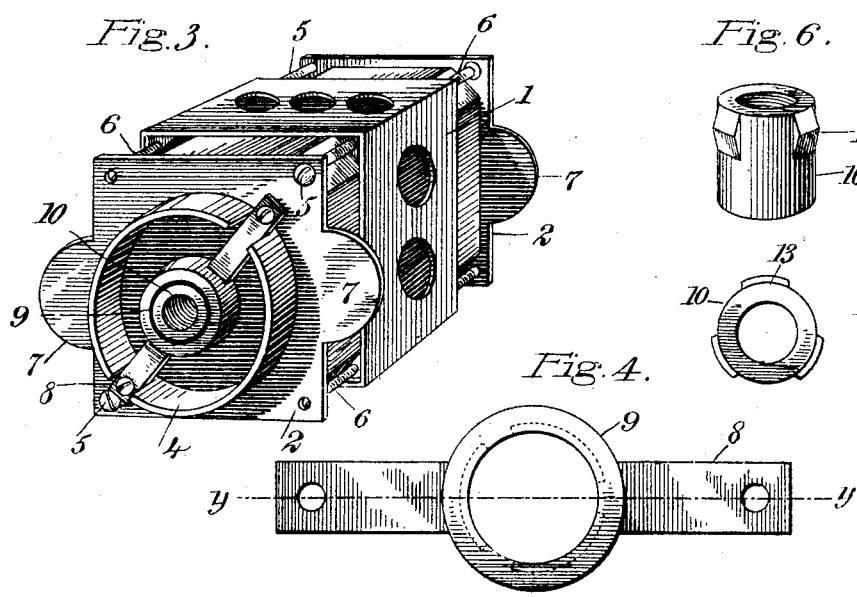
Figure 8:
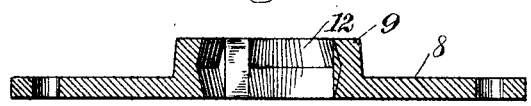

Figure 1 is an end view of a junction or outlet box embodying my invention. Fig. 2 is a section on the line $x$ $x$ of Fig. 1. Fig. 3 is a perspective view of the box. Fig. 4 is a face view of a fixture-supporting bar used in connection with the box. Fig. 5 is a section on the line $y$ $y$ of Fig. 4. Fig. 6 is a perspective view of a fixture-receiving nipple used with the bar. Fig. 7 is an end view thereof, and Fig. 8 is a section showing the bar and nipple together.

Referring to the drawings, 1 designates the body of the box, designed to be placed in a wall, partition, ceiling, or floor and opening either at one side or both sides thereof. This body has one or more openings through which wires may pass to the interior. On each end of the body is a cover 2, the flange portion of the cover being sufficiently long to permit of a considerable lengthwise adjustment of the box to accommodate it to different thicknesses of walls or the like.

Each cover has an opening 3, through which the fingers or a suitable implement may be passed to manipulate the wires in the box, and surrounding the opening is a flange 4 for the purpose of bringing the opening flush with the plaster or other finish line. The covers are held in position by means of screws or bolts which engage in tapped lugs situated in the body. I prefer to use four screws, of which two opposite screws 6 engage against the inner surface of the cover, while the heads of the two other opposite screws 5 engage the outer surface. While the tapped lugs are shown in the corners, they may be placed at the sides, and in some cases where four screws will not be suitable any other number of screws engaging in corresponding lugs may be substituted. By this arrangement the cover or box may be adjusted to considerable irregularities of the wall-surface, and as a further means for leveling or straightening the box I provide each cover with outwardly-extended wings 7, which will bear against the wall-surface so as to engage tightly thereon. By this means the box must of necessity be approximately straight even without adjustment, the wings preventing the box being set in any other than its proper position.

Extended across the opening 3 of a cover and removably connected to the cover is a fixture-supporting bar 8, and at the center of the bar is a ring 9, in which the interiorly-threaded nipple 10 is placed, this nipple 10 being designed to receive a fixture for an electric lamp or the like. This nipple is insulated from the bar by means of insulating material 11, and to firmly hold the nipple in place the inner wall of the ring 9 is concaved, as indicated at 12, and the nipple has correspondingly-shaped lugs 13. After placing the nipple in the ring the insulating material in a plastic state is forced between the nipple and the inner wall of the ring and hardened by any suitable process.

It has been customary to support a stud or boss in the back of the box by means of screws or bolts, and to this stud or boss a fixture is connected and supported by means of an insulating-joint and a so-called "hickey," which is inserted between the insulating-joint and the fixture proper for the purpose of bringing the wire out of the fixture-stem.

By means of my invention the fixture-insulating support takes the place of the three devices enumerated above, thus confining them all into one, and therefore the fixture-support embodying my invention is much simpler and is obviously of much less cost.

Having thus described my invention, I claim as new and desire to secure by Letters Patent—

1. A junction-box comprising a body, an adjustable cover therefor, diagonally opposite screws passing through the cover and engaging with the box, diagonally opposite screws engaging with the box and engaging with the inner surface of the cover and wings extended laterally from the cover at two opposite sides and between the screws of said sides.

2. A junction-box comprising a body portion, a cover therefor having an opening, a fixture-supporting bar removably connected to the cover and extended across said opening, a ring portion in said bar, the inner wall of said ring portion being concaved, an interiorly-threaded nipple having lugs corresponding substantially to the shape of said inner wall, insulating material between said nipple and ring, leveling devices for the cover whereby the cover may be moved outward and inward axially of the box, and laterally-extended wings at the opposite sides of the cover between the leveling devices.

3. A junction-box comprising a body portion, a cover therefor having an opening, a fixture-supporting bar removably connected to the cover and extended across said opening, a ring portion in said bar, the inner wall of said ring portion being concaved, an interiorly-threaded nipple having lugs corresponding substantially to the shape of said inner wall, insulating material between said nipple and the ring leveling devices for the cover, and laterally-extended wings at opposite sides of the cover between the leveling devices.

4. The combination with an outlet-box for electric conductors, of a plate having an opening for the passage of the conductors, adjustable screws engaging the box to support the plate at its under side, openings affording access of an instrument for adjusting said screws, and independent headed adjustable screws directly engaging the box and having their heads engaging the outer side of the plate in a plane intersecting the plane of location of the first-mentioned screws, the second - mentioned screws being free on their shanks to permit the depression of the plate thereon while it is supported by the other screws.

5. The combination with an outlet-box for electric conductors, of a plate having an opening for the passage of the conductors, adjustable screws engaging the box to support the plate at its under side, openings in the plate over said screws affording access of an instrument for adjusting them, and independent headed adjustable screws directly engaging the box and having their heads engaging the outer side of the plate in a plane intersecting at right angles the plane of location of the first-mentioned screws, the second-mentioned screws being free on their shanks to permit the depression of the plate thereon while the latter is supported by the other screws.

In testimony whereof I have signed my name to this specification in the presence of two subscribing witnesses.

LUDVIG H. NIELSEN.

Witnesses:
C. R. FERGUSON,
EVERARD BOLTON MARSHALL.